July 6, 1965  M. J. SMITH  3,192,671
PANEL STRUCTURES
Filed April 10, 1961  4 Sheets-Sheet 1

INVENTOR.
MARGARET J. SMITH
BY
ATTORNEY

July 6, 1965  M. J. SMITH  3,192,671
PANEL STRUCTURES
Filed April 10, 1961  4 Sheets-Sheet 2

INVENTOR.
MARGARET J. SMITH
BY
ATTORNEY

July 6, 1965    M. J. SMITH    3,192,671
PANEL STRUCTURES

Filed April 10, 1961    4 Sheets-Sheet 3

INVENTOR.
MARGARET J. SMITH
BY
*Gordon C. Mark*
ATTORNEY

July 6, 1965  M. J. SMITH  3,192,671
PANEL STRUCTURES
Filed April 10, 1961  4 Sheets-Sheet 4

INVENTOR.
MARGARET J. SMITH
BY
ATTORNEY

United States Patent Office 3,192,671
Patented July 6, 1965

3,192,671
PANEL STRUCTURES
Margaret J. Smith, Akron, Ohio, assignor to The United States Stoneware Company, Tallmadge, Ohio, a corporation of Ohio
Filed Apr. 10, 1961, Ser. No. 101,971
5 Claims. (Cl. 50—368)

This invention relates to panel structures in which panels are used with edge elements of a new design. These edge elements are used with panels which comprise a core covered with surface sheets, and the elements cover and protect the edges of the core which would otherwise be exposed to the atmosphere. Various types of edge elements are referred to herein, some of which join two panels together. The invention includes these new edge elements as well as the combination thereof with panels in panel structures. The panel structures are employed in the construction of buildings and containers, etc.

The edge elements are preferably extruded. They may be formed of aluminum or other metal, or of rigid plastic, such as rigid polyvinyl chloride, etc. They may be formed from laminated reinforced sheets. The exposed surface of the edge elements may be flat or it may follow the contour of the inner surface which is grooved, as will be explained, or it may be any other shape that lends itself to extrusion.

The panels used in the structures of this invention can be manufactured in many different configurations. They are basically composed of a core with surface sheets. The surface sheets protect the cores from direct exposure to the weather and the edge elements protect their edges. The panels may be of typical structural sandwich construction in which the cover sheets take the beam tension and compression loads and the core takes the shear load, or the panels may be non-structural in which case the sheets provide a decorative or protective purpose, or both, and the core an insulating or rigidizing purpose, or both. The edge elements serve as a load transfer member for the former, as well as a sealing device to protect the core in both types of panels.

Ordinarily, the edge elements will be bonded to the panels by an adhesive. A structural adhesive will be used if the panels are load-bearing and may be a mere sealant if the panels are merely decorative or protective. The edge elements may be fastened to the panels by rivets or the like, and in that case the use of any adhesive is optional.

The edge elements may be of several designs. They may form joints, with means for holding two different panels together; they may be used in window structures and door structures; and they may be used under panels and above panels, and in roof structures; they may be used in removable panels in a packing box or the like.

Difficulty has been experienced in the past with edge elements designed to protect the edges of panels composed of core materials which are affected by moisture. Moisture from the surroundings, either on the ground or in the atmosphere (and particularly in tropical climates) is drawn into such panels between the edge elements and the surface sheets of the panels. Once the moisture has penetrated the panel structure in this way, it attacks the core and/or binding material and the panel deteriorates rapidly.

Each of the edge elements of this invention includes two opposed walls united by one or more spacers. These walls are narrow, and two or three or four or more transverse grooves in one surface of each wall extend the length of the element. These grooves are located in those wall surfaces which contact the surface sheets of the panel. In those structures in which a panel is held between the walls of the edge elements, the grooves are in the inner surfaces of the walls; in those edge elements which are inserted between protruding edges of the surface sheets of a panel, the grooves are in the outer surfaces of the walls.

When adhesive is used in assembling an edge element with a panel, adhesive is put in one or more of the grooves, and one or more grooves in the final assembly contain no adhesive. The empty grooves break any tendency for moisture to travel the width of the walls of the edge elements by capillary attraction, and thus gain access to an edge of the panel core.

Moisture tends to travel into the panel assembly between the surface of a panel sheet and the surface of a wall of an edge element where these walls are close together, but the empty grooves provide spaces so wide that the capillary path is broken. If the empty grooves are adjacent the edges of the edge element open drainage of the collected moisture is all that is necessary. If these grooves are filled with adhesive, and the inner grooves are empty, drainage holes are necessary for doing away with the collected moisture.

Therefore, in the preferred structure, the outer grooves are empty. Moisture may be brought to the first groove but no further unless sufficient moisture is brought to the first groove to fill it. Then capillary attraction between the next section of the surface of the wall of the edge element and the surface sheet may draw the moisture further into the panel structure, but the second groove limits the extent of such penetration. Thus, where there is a great deal of moisture, several empty grooves may be required, and where there is less moisture a single empty groove may suffice.

The structure of the panels may vary widely. The surface sheets may be of metal, such as aluminum, stainless steel, etc., or a moisture-impermeable plastic such as a phenol-formaldehyde resin, etc. The core bonded to the sheets may be wood, paper, plastic or metal, and the core may be laminated, formed or foamed, etc.

As an example of a panel structure, reference is had to a panel 1 1/16 inches thick. The surface sheets are composed of aluminum, and each is .032 inch thick. The core material, which is one inch thick, is composed of foamed plastic which is bonded to the sheets with an epoxy-type adhesive.

Present panel structures that use a continuous bonded area between the surface sheets and edge elements, allow moisture to enter the panel and attack the core because all adhesives are porous to some degree and there is therefore some moisture that gets through this barrier. According to this invention, at least one empty groove is used to provide a positive break in any otherwise continuous moisture path.

The invention is further described in connection with the accompanying drawings, in which—

Figure 1:
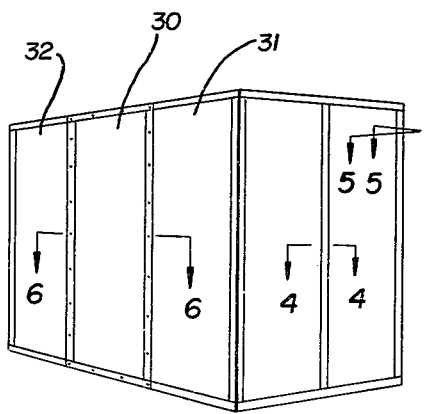
FIGS. 1 and 2 are views in perspective of large shipping cases or other structures for inside or outside use such as a shipping container, a storage unit, an incubator, a shelter, a doghouse, etc.
Figure 2:
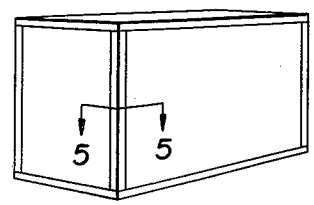
Figure 3:
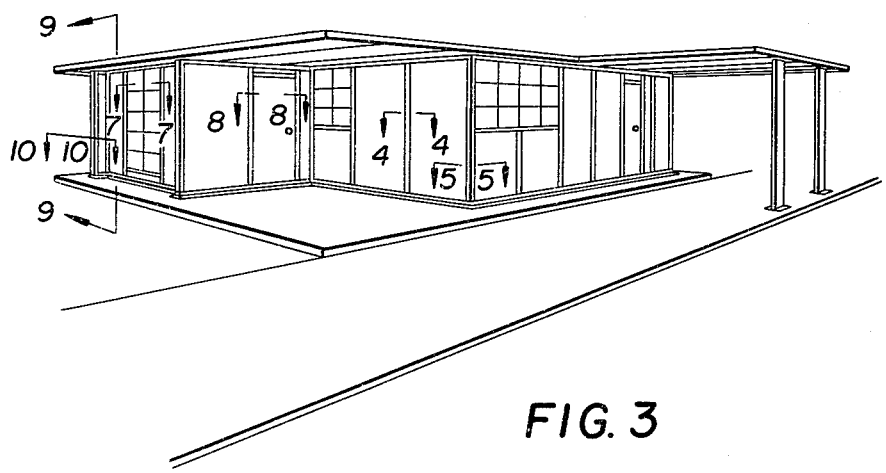
FIG. 3 is a view in perspective of a one-story home.

FIGURES 1 to 3 are illustrative of the various types of panel structures in which the edge elements may be utilized. In FIGURE 1 there are several panels at each side of the structure, and in FIGURE 2 there is but a single panel in each side of the structure. The tops and bottoms of these structures, if any, may comprise one or more panels. The top might be removable or hinged (similar to FIGURE 6 or 8). The structures may be larger or smaller. They may be shipping containers such as are used for large appliances or for over-seas shipments. They may be relatively small structures, such as might be used on a farm for housing small animals or the like. They might be used inside of another structure as, for example, a cold or hot compartment or the like within a commercial building or dwelling.

FIGURE 3 illustrates various types of panel-and-edge-element structures, such as might be found in a dwelling or a business building, etc.

Figure 4:
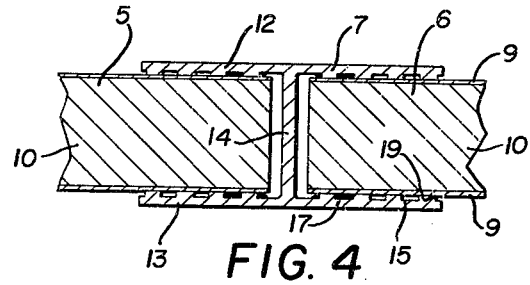
FIG. 4 is a section through the edges of two panels, on the line 4—4 of FIG. 1 or FIG. 3, the two panels being held together by an edge element which forms a joint.

In FIGURE 4, two panels 5 and 6 are joined together with a double-faced edge element 7 which forms a joint. Each of the panels comprises a surface sheet 9 on its top and bottom, and a core 10 within the surface sheets.

The edge element 7 is extruded from aluminum, but might be extruded from other metal or a plastic. The edge element of FIGURE 4 comprises two parallel walls 12 and 13 joined at their center by the spacer 14. The drawing illustrates three grooves 15 in the inner surface of each wall on each side of the spacer, in addition to the groove adjacent to the spacer. The number and shape of the grooves may be varied.

In assembling the structure, adhesive 17 is put in the groove 15 of each wall nearest the spacer. Then as the panel and edge elements are slid together to their final position, some of the adhesive is carried over into each inside groove adjacent the spacer 14. The adhesive that contacts the surface sheets 9, both that in the grooves and the thin coat on the intervening raised wall, forms a good bond between the edge element and the surface sheets.

The empty grooves stop capillary attraction. The raised area 19 of the wall adjacent the edge of the edge element is in close contact with the surface sheet 9. In a damp, tropical climate, or during a rain storm, or on a dewy night, moisture will be drawn into the space between the surface 19 and the surface sheet 9 of the panel. Capillary attraction will draw the moisture as far as the first groove 15. When it reaches this groove the capillary is broken. If there is sufficient moisture to fill this groove or produce an atmosphere of very high moisture content, moisture may tend to be drawn into the second groove by capillary attraction. The number of empty grooves employed will depend upon the atmospheric conditions which are normal to the climate in which the structure is used, the size of the grooves, etc.

Figure 5:
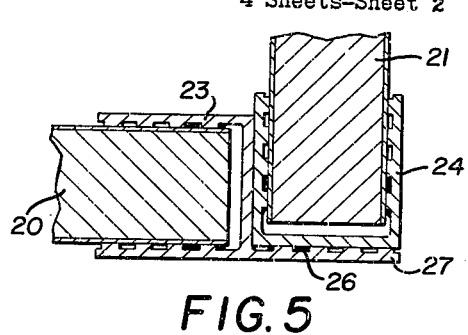
FIG. 5 is a section through the edges of two panels on the line 5—5 of FIG. 1, 2 or 3, held at right angles to one another, using a modified from of the edge element.

The edge element of the structure of FIGURE 5 shows two panels 20 and 21 at right angles to one another. The panel 20 is held in the edge element 23, which is similar to the edge element 7 of FIGURE 4 except that one of the walls is removed. The edge element 24 is identical with one-half of the joint 7 of FIGURE 4. This edge element 24 is held to the element 23 by adhesive 26 which is in one of the grooves of the wall 27. The adhesive from this groove spreads over the adjoining raised wall surface and into the end groove by sliding the panel 21 over the wall 27, to bring it to its final position.

It will be noted that adhesive is used in the manner explained in connection with FIGURE 4, wherever a grooved wall of an edge element is in contact with the surface sheet of a panel. The empty grooves prevent penetration of moisture by capillary action.

Figure 6:
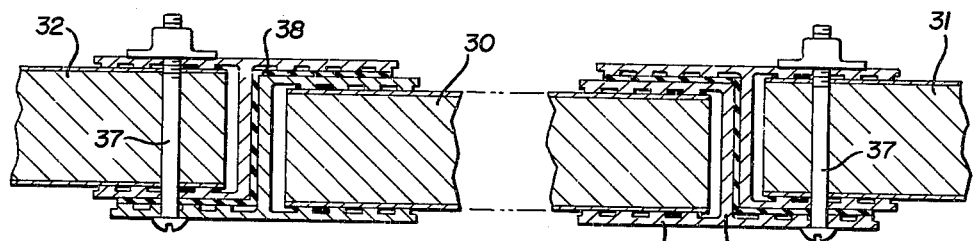
FIG. 6 is a section through a removable panel (partly broken away) between stationary panels on the line 6—6 of FIG. 1.

FIGURE 6 illustrates a section through a structure in which there is a removable panel 30 between two stationary panels 31 and 32. Edge elements 34, like the element 23 of FIGURE 5, are used over the edges of the panels 31 and 32. Similar elements 35 are used over the edges of the removable panel 30. The panel 30 is held in place by the through-bolts 37. Adhesive is used in the manner described, wherever the grooved surface of an edge element is brought into contact with the surface sheet of a panel. Because the panel is removable, no adhesive has been used on any grooved surface of an edge element where it is brought into contact with the flat surface of another edge element. A sealant strip of a suitable gasket material 38 may be bonded to the fixed structure.

Figure 7:
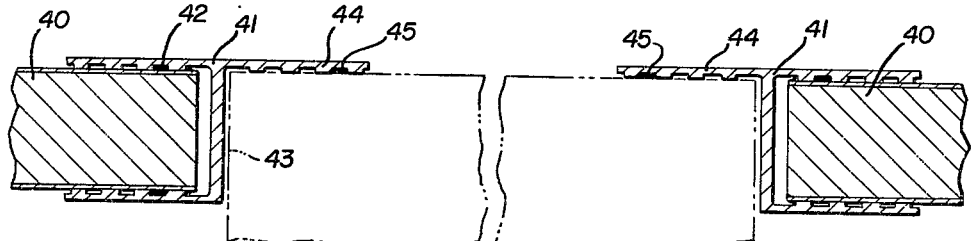
FIG. 7 is a horizontal section through a commercial window or jalousie (partly broken away) on the line 7—7 of FIG. 3.

The structure shown in detail in FIGURE 7, is somewhat more complicated. It shows a typical opening for a window, control box, air conditioner or the like. The panels 40 have their edges protected by elements 41 which are of the same general structure as the element 23 of FIGURE 5. Adhesive 42 is used where the walls of these elements 41 contact the surface sheets of the panels 40. Windows or the like of any suitable structure 43 are held in place against the grooved surface of the extended walls of 44 of elements 41. Adhesive 45 is used between structure 43 and the groove-contacting surfaces of the elements 41 to exclude moisture from the building.

Figure 8:
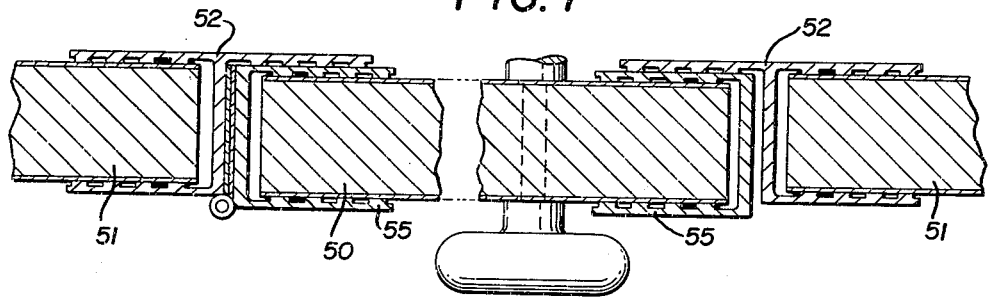
FIG. 8 is a horizontal section through a door (partly broken away) on the line 8—8 of FIG. 3.

The door structure 50 of FIGURE 8 is located between the two panels 51. The edge elements 52 are the same design as the elements 23 of FIGURE 5. The edges of the door panel are embraced by single edge elements 55. The hinge 56 is fastened to one of these edge elements 55 and to one of the edge elements 51.

Figure 9:
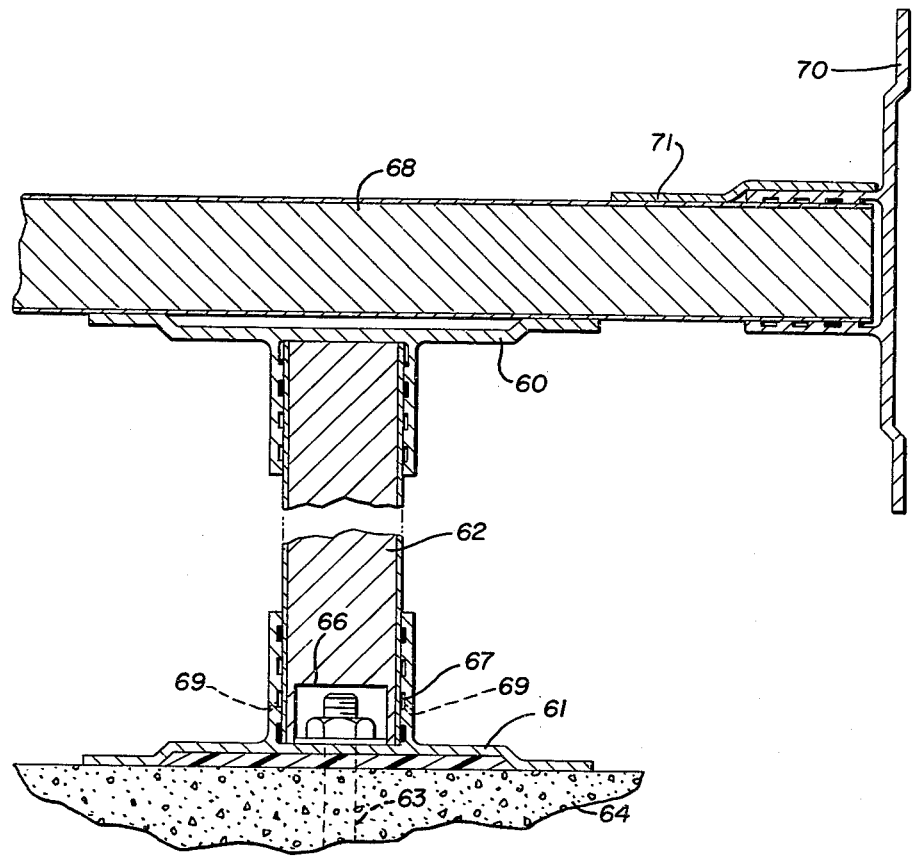
FIG. 9 is a section through an upright panel (partly broken away), floor and roof, on the line 9—9 of FIG. 3.

FIGURE 9 is a vertical section showing edge elements 60 and 61 which embrace the tops and bottoms of the panel 62. The element 61 is bolted by the bolt 63 to the foundation footing support 64, and the space between the two may be filled with caulking, grout or the like. Although in the previous drawings the end of the panel has not touched the inner surface of the edge element, the end of the panel 62 of FIGURE 9 rests on the edge element 61 to get the support required to hold the roof of the house. The space provided in the previous drawings is an allowance for expansion and contraction. If necessary, the core of the panel is cut away at 66 to provide space for the bolt 63 and nut. Adhesive 67 is advantageously applied in the top grooves of the bottom element to exclude water that is gravity fed, as well as in the bottom grooves at 68. If it is possible that sufficient water may get through the top adhesive bonds, drain holes 69 are provided to empty collected moisture immediately above the top adhesive. The empty grooves break up any continuous capillary-formed path of moisture.

The roof 68 is of panel construction, and there is a trim 70 around the edge of the roof which is an edge element of the same design as the elements 60 and 61. Drainage through the trim is provided as required. The roof flashing 71 seals the edge element from standing water. The empty grooves in the various edge elements break the capillary action of water that would otherwise be drawn between the walls of the edge elements and the panels.

Figure 10:
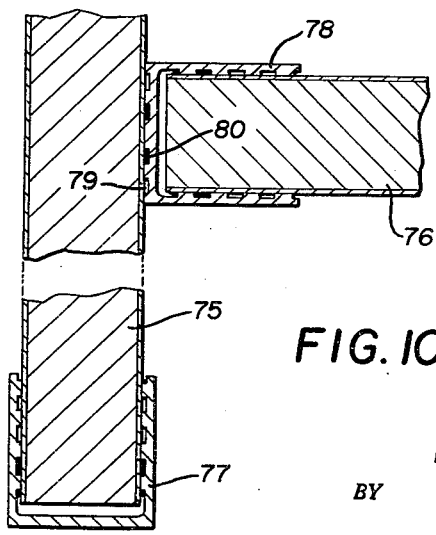
FIG. 10 is a horizontal section through two walls (partly broken away) on the line 10—10 of FIG. 3.

FIGURE 10 is a horizontal section through the fin wall 75 which projects beyond the wall 76. The edge element 77 is a single element similar to the element 23 of FIGURE 5. The edge element 78 is different, in that there are grooves 79 in the end wall and there is adhesive 80 in these which holds this element against the wall. The empty grooves prevent moisture from being drawn into the house at this juncture by being drawn into the core of the panel 76 by capillary attraction, and thence to the interior of the house.

Figure 11:
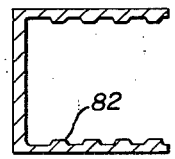
FIGS. 11, 12 and 13 are section of edge elements with different types of grooves.
Figure 12:
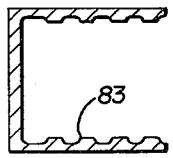
Figure 13:
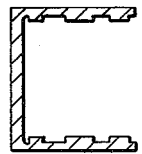
Figure 14:
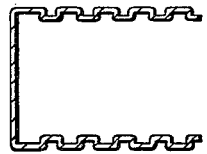
FIG. 14 is an edge element with a wall of substantially uniform thickness.

In most of the views, the grooves are square-cornered and evenly spaced. FIGURES 11, 12, 13 and 14 show alternative structures, and the grooves may be any suitable shape. In FIGURE 11 the sides 82 of the grooves are flat but not perpendicular. In FIGURE 12 the sides 83 of the grooves are curved. In FIGURE 13, although the corners of the grooves form right angles, the grooves are unevenly spaced. In FIGURE 14 the wall of the edge element is of substantially uniform thickness throughout.

FIGURES 15 to 20 show a different type of panel structure in which the edge elements are telescoped between the protruding edges of the surface sheets of a panel forming a flush joint, instead of embracing the surface sheets.

Figure 15:
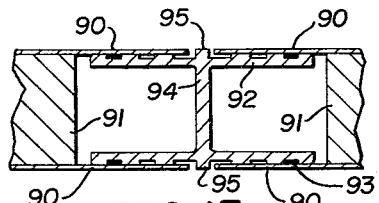
FIG. 15 is a section of a double edge element or joint flush bonded into the protruding edges of the surface sheets of two panels.

In FIGURE 15, the surface sheets 90 protrude beyond the ends 91 of the panel cores. The walls 92 of the edge element are telescoped inside of the protruding surface sheets. The grooves are in the outer surfaces of the walls 92. Although in the somewhat similar structure of FIGURE 4 the adhesive is in the grooves nearest the spacer 14, it is to be noted that in the structure of FIGURE 15 the adhesive 93 is in the grooves farthest from the spacer 94. Some adhesive may tend to be carried over to the next adjacent groove, but there is always at least one groove between the edge of each surface sheet 90 and the groove containing adhesive. Projections 95 on the outer surface of the walls 92 are ornamental and likewise they serve as guides to insure the insertion of the right portion of each wall 92 within the edge of each panel.

Figure 16:
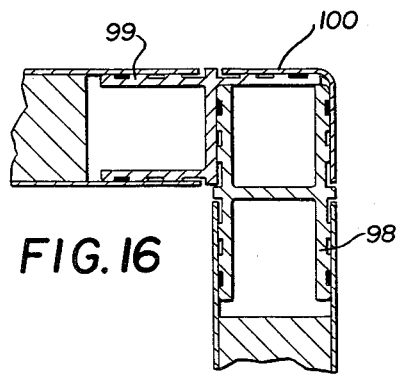
FIG. 16 is a section through a right-angular joint utilizing a modification of the form of edge element structure shown in FIG. 15 to join the protruding surface sheets of two panels at a right angle.

FIGURE 16 shows one way of forming a corner with edge elements of this general type inserted in the ends of the panels. The edge element 98 is similar in shape to the element illustrated in FIGURE 15. This is combined with the edge element 99 in which there are only three wall projections instead of four. Adhesive is used in the interior grooves of those wall surfaces of the edge elements which contact the surface sheets of the panels. Adhesive is shown in grooves in that wall of the element 98 which contacts the element 99 as well as in that wall of both of the elements 98 and 99 which contact the decorative trim 100 in order to stop moisture transfer from the exterior of the building to the interior.

Figure 17:
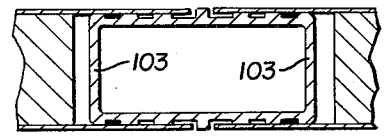
FIG. 17 is a section through a different type of edge element, serving as a flush joint between the protruding surface sheets of two panels.

The structure of FIGURE 17 is similar, except that the spacers 103 are located at the ends of the edge element instead of at the middle. In these edge elements in which the grooves are in the outer surfaces of the walls, the location of the one or more spacers is immaterial.

Figure 18:
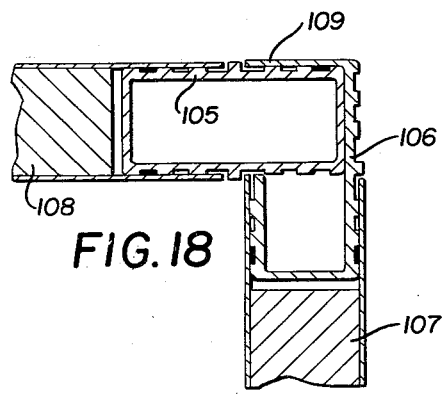
FIG. 18 is a section through a right-angular joint using a modification of the edge element structure of FIG. 17 between the protruding surface sheets of two panels.

In FIGURE 18, a different type of right-angular joint structure is shown. The edge element 105 is similar in construction to the element 103 of FIGURE 17. The edge element 106 which is combined with this, is identical with element 105 except that part of it has been removed. Adhesive is used in the manner described, in only the grooves of the walls of the elements 105 and 106 which contact the surface sheets of the panels 107 and 108. Adhesive is used in one groove 109 in that wall of the element 105 that contacts the element 106, as shown, in order to prevent moisture transfer from the exterior to the interior. Empty grooves are provided between the elements and the surface sheets to break capillary action.

Figure 19:
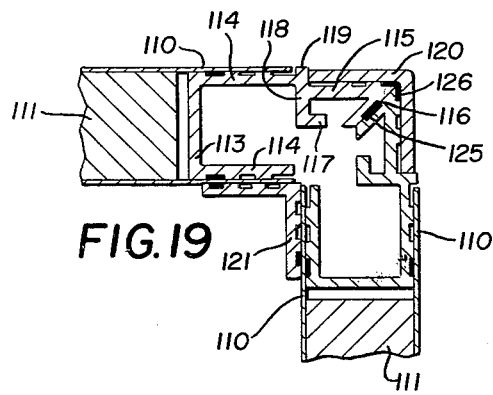
FIG. 19 is still another type of right-angle structure with a different type of edge element structure.
Figure 20:
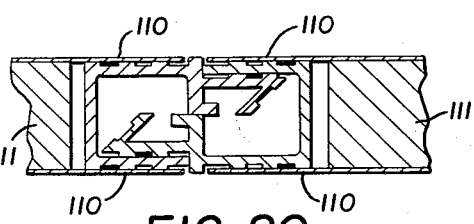
FIG. 20 is a section through a straight-line structure showing a different method of using the edge element of FIG. 19.

FIGURES 19 and 20 illustrate a different type of edge element. These are to be used with the type of panel illustrated in FIGURES 15 to 18, in which the surface sheets protrude beyond the core. The elements are formed in two identical parts so designed that a part can be located in the edge of a panel at the plant where the panel is made, in order to protect the protruding edges of the surface sheets from damage when shipped. A part of the edge element protrudes beyond the outside edges of the surface sheets, and the panels are fastened together by means of these protruding portions of the edge elements at the site where the panels are assembled. A parallel and a right-angle joint are illustrated in FIGURES 19 and 20.

In the panels of both FIGURES 19 and 20 the surface sheets 110 project beyond the cores 111. The edge elements are formed with a spacer 113 at one end. Parallel walls 114 which project from the ends of this spacer contain grooves in their outer surfaces. The wall 115 is stepped in from the wall 114 by an amount equal to the over-all thickness of this wall, and is parallel to it. The walls 114 and 115 have grooves in their outer surfaces. At the outer end of the wall 115 is the wall 116 which slants back at an angle which is preferably about 45 degrees. It slants toward the projection 117 on the wall portion 118 which joins the outer end of the wall 114 with the inner end of the wall 115. The wall 116 and projection 117 extend half way from one wall 114 to the other wall 114. The wall 118 may advantageously project on the outer surface of the edge element at 119 to serve as a guide in locating the edge element within the panel. It is advantageous to have the distance between the ends of the wall 116 and projection 117 less than the length of the projection 117, so that when two of these edge elements are arranged in a position opposed to one another, as in FIGURE 20, there is continuous contact of the wall 116 and projection 117 of one edge element with the wall 116 and projection 117 of the other edge element as the two edge elements are slid into position one against the other. Thus, the projection 117 of the one element bridges the space between the wall 116 and projection 117 of the other element.

It is only the grooves in the walls 114 of these edge elements that contact the surface sheets of the panels, so it is only grooves in these walls that are left empty to prevent capillary attraction. All of the grooves in the outer surface of the wall 115 of each element can be filled with adhesive to hold the trim unit 120 in place. This element 120 and the identical element 121 hold the two edge elements together. Adhesive is applied in the end grooves shown in element 121 and between these two grooves and the ends of the element 121 there is adhesive between this element 121 and the adjacent surface sheets of the panels 110 and 111. Adhesive may be used in grooves 125 between the two mating surfaces of the walls 116, if desired, as well as in grooves 126 at the exterior corner of the two edge elements.

In uniting the two panel-and-edge-elements of FIGURE 20, the two assemblies are slid into place, with the grooved wall of each assembly sliding over the inner surface of the wall 114 of the other assembly. Adhesive is applied to the surfaces as shown to prevent moisture from traveling from one side of the structure to the other. The angled walls 116 slide against one another in aligning the two assemblies, and then the end of each of these walls 116 slides over the projecting wall 117 of the other assembly, and then the projections 117 of the respective assemblies slide over one another, and the edge elements eventually are brought to rest with the projections 117 in contact with one another, providing a load transfer junction.

The invention is covered in the claims which follow.

What I claim is:

1. The combination of a panel composed of a core and two surface sheets which protrude parallel to one another beyond one edge of the core, and an edge element composed of two parallel walls and a spacer between them, the core of the panel being subject to attack by moisture and being exposed at the edge of the panel within the edge element, the outer surfaces of said walls being close to the inner surfaces of said protruding portions of said surface sheets and forming a capillary between them, and the spacer covering said end of the core, a plurality of grooves substantially parallel to the spacer in the outer surface of each wall and extending the length thereof, with the space between the panel and the groove nearest said core filled with adhesive, and the groove farthest from said core empty and forming a break in the capillary on both sides thereof.

2. The structure of claim 1 in which the spacer is located beyond the protruding edges of the surface sheets.

3. The structure of claim 1 in which the spacer joins the two walls adjacent the end of the core.

4. The combination of an edge element and two panels, each panel comprising a core and two parallel surface sheets which protrude beyond one edge of the core thereof, the core of each panel being subject to attack by moisture and being exposed at the edge of the panel within its edge element, said protruding portions of the surface sheets of the respective panels extending toward one another, the edge element being composed of two parallel walls and a spacer between them, said two walls being within the protruding portions of the surface sheets and close enough thereto to provide capillary spaces therebetween, there being a plurality of more than two grooves in the outer surfaces of the two walls each extending longitudinally thereof, the grooves in each wall nearest the cores of the panels being filled with adhesive which adheres to the panel nearest to it, and the grooves in each wall farthest from the cores being empty and forming a break in the capillary space between that wall and the surface sheet adjacent to it.

5. The structure of claim 4 in which there is a raised area of substantially the thickness of the surface sheets on the outer surface of each of the parallel walls which fills substantially the whole of the space between the surface sheets of the respective panels.

References Cited by the Examiner

UNITED STATES PATENTS

| | | | |
|---|---|---|---|
| 1,429,351 | 9/22 | Jackson | 20—4 |
| 1,976,968 | 10/34 | Sheldon | 50—221 |
| 2,073,278 | 3/37 | Hohl | 50—203 X |
| 2,079,635 | 5/37 | Sharp | 50—144 X |
| 2,188,090 | 1/40 | Young | 50—173 X |
| 2,339,220 | 1/44 | Crowley | 50—173 X |
| 2,887,732 | 5/59 | Kloote et al. | 50—268 X |
| 2,934,180 | 4/60 | Hammitt et al. | 189—34 |
| 2,982,380 | 5/61 | Rose | 50—413 X |
| 3,003,810 | 10/61 | Kloote et al. | 20—4 X |
| 3,039,232 | 6/62 | Dunn | 50—268 X |
| 3,082,848 | 3/63 | Keller | 189—34 |

HENRY C. SUTHERLAND, *Primary Examiner.*

WILLIAM I. MUSHAKE, JACOB L. NACKENOFF,
*Examiners.*